United States Patent
McDonald et al.

(10) Patent No.: US 9,261,027 B2
(45) Date of Patent: Feb. 16, 2016

(54) FUEL CUTOFF TESTING SYSTEM

(71) Applicant: The Boeing Company, Chicago, IL (US)

(72) Inventors: Darren Gordon McDonald, Federal Way, WA (US); Bryan Douglas Welsh, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/332,649

(22) Filed: Jul. 16, 2014

(65) Prior Publication Data
US 2016/0017816 A1   Jan. 21, 2016

(51) Int. Cl.
*F02C 9/26* (2006.01)
*F02C 9/22* (2006.01)

(52) U.S. Cl.
CPC ...................... *F02C 9/26* (2013.01)

(58) Field of Classification Search
USPC ........ 701/3, 15, 100, 104–105, 112; 123/357, 123/359, 347; 340/945, 963; 141/192, 206; 60/790
See application file for complete search history.

(56) References Cited

U.S. PATENT DOCUMENTS

| | | | | |
|---|---|---|---|---|
| 3,691,759 A * | 9/1972 | Scheerer | ................. | 60/39.091 |
| 4,364,351 A * | 12/1982 | Romblom et al. | ............ | 123/357 |
| 5,129,221 A * | 7/1992 | Walker et al. | .................. | 60/778 |
| 5,653,421 A * | 8/1997 | Ellzey | ........................ | 251/129.1 |
| 6,341,629 B1 * | 1/2002 | Clark et al. | ..................... | 141/83 |
| 2004/0032343 A1 * | 2/2004 | Henderson | ..................... | 340/963 |

OTHER PUBLICATIONS

Extended European Search Report, dated Dec. 11, 2015, regarding Application No. EP15176775.3, 5 pages.
Latimer et al., "C-17 Engine-Out Compensation System Testing," IEEE Aereospace Conference Proceedings, vol. 3, Jan. 1999, pp. 43-51.
"Flight Test Guide for Certification of Transport Category Airplanes," Federal Aviation Administration Advisory Circular No. 25-7C, Oct. 2012, 20 pages.

* cited by examiner

*Primary Examiner* — Yonel Beaulieu
(74) *Attorney, Agent, or Firm* — Yee & Associates, P.C.

(57) ABSTRACT

A method and apparatus for controlling operation of an engine in an aircraft. A time when a cutoff speed for the aircraft will be reached at which a flow of fuel is to be stopped is identified. A delay between sending a command to move a switch to an off position and the time at which the engine ceases operation is also identified. The command is sent based on the predicted time and the delay. The command causes the switch to move to the off position moving a fuel control switch for the engine of the aircraft to a shut off position to stop the flow of fuel to the engine.

20 Claims, 8 Drawing Sheets

FUEL CUTOFF TESTING SYSTEM

BACKGROUND INFORMATION

1. Field

The present disclosure relates generally to aircraft and, in particular, to testing aircraft. Still more particularly, the present disclosure relates to a method and apparatus for testing aircraft in which an engine ceases to operate.

2. Background

In designing and certifying aircraft, various types of testing are performed. The tests are performed to determine whether an aircraft meets different types of performance standards. These standards may relate to safety, air pollution, noise, passenger comfort, and other suitable types of standards. Based on the results of the testing, an aircraft may change in design. In other cases, procedures on operating aircraft may be developed based on the tests. For example, different procedures may be identified for operating an aircraft under different conditions. These conditions may include weather, status of the equipment in aircraft, and other conditions.

For example, one test that may be performed on an aircraft involves identifying a minimum controllability speed for the aircraft. This speed is identified for aircraft in the event that one of the engines of the aircraft ceases to operate while the aircraft is moving on the ground during a takeoff phase of flight.

With this test, the operation of the engine is cutoff at different speeds while the aircraft is accelerating with maximum thrust applied for takeoff. These speeds are referred to as cutoff speeds. The operation of the engine is cutoff by a pilot moving a fuel control switch to a cutoff position. When the fuel control switch moves to the cutoff position, the fuel to one engine of the aircraft is cutoff. As a result, the engine stops operating.

The pilot attempts to move the fuel control switch to the cutoff position as close as possible to the time at which a cutoff speed is reached for the test such that the engine operation ceases about when the aircraft reaches the cutoff speed. When the operation of the engine ceases, lateral deviation occurs for the aircraft, which is controlled by the pilot using directional control inputs.

Data is gathered about the performance of the aircraft in response to the engine ceasing operation. One piece of data is the amount of lateral deviation. This lateral deviation towards the edge of the runway is a strong function of the cutoff speed.

The cutoff speed may be selected for the initial test in which the lateral deviation is expected to be less than 30 feet. Subsequent tests may involve successively reducing the cutoff speed until a lateral deviation of at least 30 feet is obtained.

In this manner, a minimum controllability speed at which a decision point may be made as to whether to halt a takeoff or continue with a takeoff in the event that an engine ceases operating is identified. If minimum controllability speed is not exceeded, that takeoff is aborted in this example.

Moving the fuel control switch to the cutoff position at the cutoff speed selected for the test requires concentration and good dexterity. The pilot anticipates when the speed selected for the test will be reached and moves the fuel control switch such that the cutoff position occurs as close to the selected speed as possible.

Moving the fuel control switch to the cutoff position when the selected speed is reached is a difficult operation to perform. Often times, the speed may be too low or too high. As a result, the undesired result of departing the side of the runway is greatly increased. In addition, the test may be repeated in an attempt to collect data for the desired speed.

These additional tests may increase the wear and tear on the engine and other portions of the aircraft. As a result, maintenance may be required sooner and more often than desired. Furthermore, repeat test points require the use of additional fuel and time on a runway. In some cases, the data collected may not be as consistent as desired based on the ability of the pilot to move the fuel control switch to the cutoff position at the selected speed for the test.

Therefore, it would be desirable to have a method and apparatus that take into account at least one of the issues discussed above as well as possible other issues. For example, it would be desirable to have a method and apparatus that increases the accuracy and reduces the effort needed to test an aircraft to obtain information for identifying a minimum controllability speed for the aircraft.

SUMMARY

An embodiment of the present disclosure provides an apparatus comprising a switch and a test processor. The switch moves to an off position to stop a flow of fuel to an engine for an aircraft from a fuel source such that the engine ceases operation. The test processor identifies a time when a cutoff speed will be reached at which the flow of fuel is to be stopped. The test processor also identifies a delay between sending a command to move the switch to the off position and when the engine ceases operation. Further, the test processor sends the command based on the time and the delay.

Another embodiment of the present disclosure provides an aircraft test system comprising a switch with an arm, a test processor, a relay, and a lifter structure. The switch moves a fuel control switch for an aircraft engine to a shut off position to stop a flow of fuel to an engine from a fuel source such that the engine ceases operation. The test processor identifies a time when a cutoff speed will be reached at which the flow of fuel is to be stopped. The test processor also identifies a delay between sending a command to move the switch to the off position and when the engine ceases operation. Further, the test processor sends the command based on the time and the delay. The relay is connected to the test processor and the switch. The relay sends a signal to the switch when the relay receives the command and the signal causes the arm to move the fuel control switch to the shut off position. The lifter structure lifts the fuel control switch out of a detent for the fuel control switch.

Yet another embodiment of the present disclosure provides a method for controlling operation of an engine in an aircraft. A time when a cutoff speed for the aircraft will be reached at which a flow of fuel is to be stopped is identified. A delay between sending a command to move a switch to an off position and the time at which the engine ceases operation is also identified. The command is sent based on the time and the delay. The command causes the switch to move to the off position, in turn, moving a fuel control switch for the engine of the aircraft to a shut off position to stop the flow of fuel to the engine.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more considerations. For example, the illustrative embodiments recognize and take into account that having a human operator move a fuel control switch to a cutoff position often results in less accuracy than desired for identifying a minimum controllability speed for an aircraft.

Further, the illustrative embodiments recognize and take into account that altering or designing an aircraft to include circuits and other mechanisms to perform this test may require more effort and time than desired to ensure that an unintended cutoff in the flow of fuel to an engine for the aircraft does not occur during operation of the aircraft outside of testing for a minimum controllability speed.

Thus, the illustrative embodiments recognize and take into account that using a physical switch that moves to cause a fuel control switch to change positions is desirable. This physical switch in the illustrative embodiments is removable such that the switch is absent during normal use. In other words, the switch is not present and cannot cause an independent cutoff in the flow of fuel to an engine.

In one illustrative example, an apparatus comprises a switch and a test processor. The switch moves to an off position to stop a flow of fuel to an engine from a fuel source such that the engine ceases operation. The test processor identifies a time when a cutoff speed will be reached at which the flow of fuel is to be stopped, identifies a delay between sending a command to move the switch to the off position as well as when the engine ceases operation. The test processor also sends the command based on the time and the delay.

In this manner, the fuel flow may be stopped such that the engine ceases operation at about the cutoff speed. In this illustrative example, the accuracy in performing a test is greater than using a human operator. Further, the test processor identifies the time at which the cutoff speed will be reached and identifies a delay between sending the command as well as when the engine ceases operation. These types of operations are not performed by the human operator. As a result, an illustrative embodiment is more accurate and repeatable than performing a test using a human operator.

Figure 1:
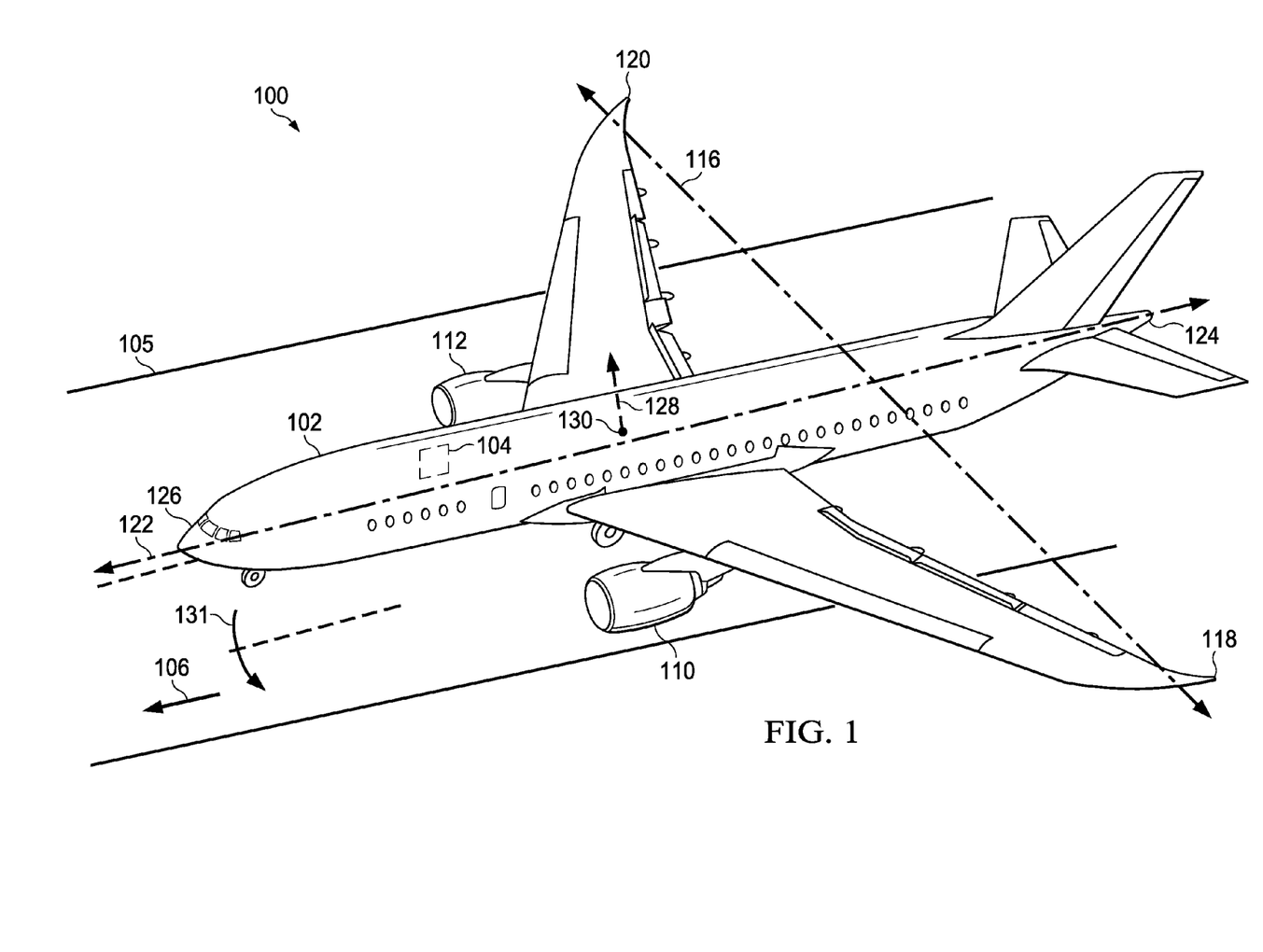
FIG. 1 is an illustration of a test environment in accordance with an illustrative embodiment.

Turning now to FIG. 1, an illustration of a test environment is depicted in accordance with an illustrative embodiment. In this example, test environment 100 is used to test aircraft 102. In particular, a test may be performed using aircraft 102 in test environment 100 to identify a minimum controllability speed for aircraft 102. As depicted, testing system 104 in aircraft 102 operates to perform a test on aircraft 102 as aircraft 102 travels down runway 105 while accelerating at different speeds for takeoff in the direction of arrow 106.

Testing system 104 cuts off the flow of fuel to engine 110 at a cutoff speed that is selected for the test. Cutting off the flow of fuel to engine 110 results in engine 110 ceasing operation. In other words, engine 110 stops producing thrust to move aircraft 102. Engine 112, in this example, continues to produce thrust.

This situation in which engine 110 does not produce thrust and engine 112 still produces thrust may result in a tendency of aircraft 102 to move about several axes. Lateral axis 116 passes from wing tip 118 to wing tip 120 of aircraft 102, and rotation about lateral axis 116 is called pitch. Longitudinal axis 122 passes from tail 124 to nose 126 of aircraft 102. Rotation about longitudinal axis 122 is called roll.

Normal axis 128 is perpendicular has an origin 130 at the center of gravity of aircraft 102 and is perpendicular to lateral axis 116 and longitudinal axis 122. Rotation about normal axis 128 is called yaw. This axis is an axis of interest in testing aircraft 102 by ceasing operation of engine 110 in one illustrative example.

For example, testing system 104 measures the longitudinal movement in the direction of arrow 106. This longitudinal movement occurs when the thrust is applied to aircraft 102 while aircraft 102 travels down runway 105 during a takeoff operation. In this particular example, when the flow of fuel is cutoff to engine 110, aircraft 102 will yaw about normal axis 128 towards the left side of runway 105. As depicted, the resulting yaw is the yaw or rotation about normal axis 128. As a result of the yaw about normal axis 128, lateral deviation in the direction of arrow 131 will occur, and the aircraft will travel closer to the edge of runway 105.

Testing system 104 cuts off fuel to engine 110 more precisely than possible by a human operator, such as a pilot. Testing system 104 identifies a time when a cutoff speed will be reached at which the flow of fuel is to be stopped for engine 110 and identifies a delay between sending a command to move a switch to the off position as well as when engine 110 ceases operation. Testing system 104 sends the command based on the time and the delay identified for moving the switch.

These identifications are currently not performed by human operators in testing aircraft 102. Instead, human operators may anticipate when the cutoff speed will be reached by looking at a speed indicator and move the fuel control switch to the cutoff position as quickly as possible as the speed gage indicates that the cutoff speed is reached.

Further, the time at which the cutoff speed is to be reached may be identified using the velocity and acceleration of aircraft 102. These types of calculations are not performed by human operators in determining when to move the fuel control switch to the cutoff position.

Figure 2:
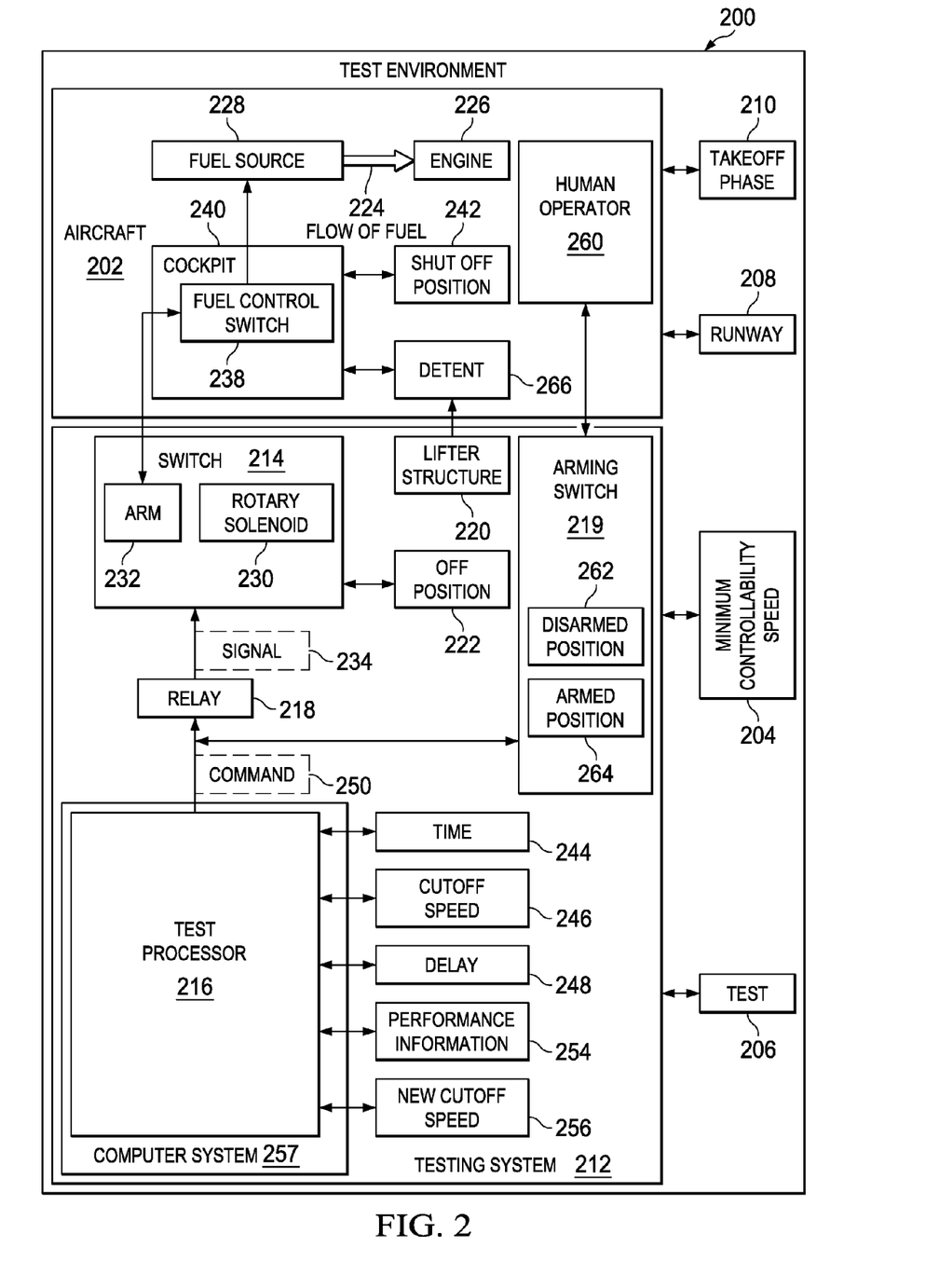
FIG. 2 is an illustration of a block diagram of a test environment in accordance with an illustrative embodiment.

Turning next to FIG. 2, an illustration of a block diagram of a test environment is depicted in accordance with an illustrative embodiment. As depicted, test environment 100 in FIG. 1 is an example of a physical implementation of test environment 200 shown in block form in FIG. 2.

As depicted, test environment 200 is one in which aircraft 202 may be tested to identify minimum controllability speed 204 for aircraft 202. As depicted, test 206 is performed as aircraft 202 travels down runway 208 during takeoff phase 210 for aircraft 202. Test 206 is performed while aircraft 202 is moving on the ground on runway 208.

In the illustrative example, test 206 is performed using testing system 212. Testing system 212 is an aircraft test system for aircraft 202 and includes a number of different components. As depicted, testing system 212 includes switch 214, test processor 216, relay 218, arming switch 219, and lifter structure 220.

As depicted, switch 214 moves to off position 222 to stop flow of fuel 224 to engine 226 for aircraft 202 from fuel source 228 such that engine 226 ceases operation. Switch 214 may take various forms. In this illustrative example, switch 214 comprises rotary solenoid 230 and arm 232. Arm 232 extends from rotary solenoid 230. Rotary solenoid 230 rotates arm 232 to off position 222 when rotary solenoid 230 receives signal 234 from relay 218.

In the illustrative example, rotary solenoid 230 with arm 232 is located in a position relative to fuel control switch 238 for engine 226 in cockpit 240 of aircraft 202 such that movement of arm 232 to off position 222 moves fuel control switch 238 to shut off position 242. As depicted, test processor 216 identifies time 244 when cutoff speed 246 will be reached at which flow of fuel 224 is to be stopped. In this illustrative example, cutoff speed 246 may take various forms.

Cutoff speed 246 may be in terms of airspeed in this illustrative example. Ground speed may also be monitored for purposes of wind. For example, a steady headwind or tailwind will result in a different ground speed for the same airspeed. Also, the ground speed has a secondary effect on the landing gear dynamics.

Test processor 216 also identifies delay 248 present between sending command 250 to move switch 214 to off position 222 and when engine 226 ceases operation. In the illustrative example, test processor 216 sends command 250 based on time 244 and delay 248. In other words, test processor 216 takes into account delay 248 when sending command 250 using time 244.

In the illustrative example, test processor 216 records performance information 254 for aircraft 202. Performance information 254 may be recorded during operation of aircraft 202 during test 206. Performance information 254 includes at least one of a speed, a ground speed, air speed, acceleration, yaw, pitch, a wind speed, an inertial acceleration, an Euler angle, a sideslip angle, a target cutoff speed, an actual cutoff speed, when armed, when the switch is triggered, a fuel flow, a yaw rate, a gross weight, a center of gravity, a brake pressure, a flap angle, or other suitable information about the performance of aircraft 202.

As can be seen in this example, performance information 254 of aircraft 202 may include a configuration of aircraft 202. This configuration may include, for example, a position of a flight control surface on aircraft 202.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

In the illustrative example, test processor 216 identifies new cutoff speed 256 based on performance information 254. New cutoff speed 256 is used in test 206 to obtain performance information 254 at new cutoff speed 256. This process may be performed any number of times to obtain performance information 254 needed to identify minimum controllability speed 204.

As depicted, test processor 216 may be implemented in software, hardware, firmware or a combination thereof. When software is used, the operations performed by test processor 216 may be implemented in program code configured to run on hardware, such as a processor unit. When firmware is used, the operations performed by test processor 216 may be implemented in program code and data and stored in persistent memory to run on a processor unit. When hardware is employed, the hardware may include circuits that operate to perform the operations in test processor 216.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In this example, test processor 216 is located in computer system 257. Some or all of computer system 257 may be located in aircraft 202 or in a remote location.

Computer system 257 is formed by one or more data processing systems in which a data processing system may be selected from one of a computer, a tablet computer, a mobile phone, or some other suitable device. When more than one data processing system is present in computer system 257, the data processing systems may be in communication with each other using a communications media such as a network.

In the illustrative example, relay 218 is connected to test processor 216 and switch 214. Relay 218 sends signal 234 to switch 214 that causes switch 214 to move to off position 222 when command 250 is received at relay 218.

In this example, command 250 may have different characteristics from signal 234. For example, command 250 may have a different current, voltage, or power from signal 234. Signal 234 may have a level of voltage, current, power, or some combination thereof needed to move rotary solenoid 230.

As depicted, arming switch 219 prevents switch 214 from operating without intervention or an active action from human operator 260. For example, arming switch 219 prevents command 250 from reaching relay 218, signal 234 being generated, or signal 234 from reaching switch 214 when arming switch 219 is in disarmed position 262 and allows at least one of command 250 to reach relay 218, signal 234 to be generated, or signal 234 to reach switch 214 when arming switch 219 is in armed position 264. In this example, armed position 264 is a depressed position.

As depicted, lifter structure 220 is a device that lifts fuel control switch 238 out of detent 266 for fuel control switch 238. Lifter structure 220 allows switch 214 to move fuel control switch 238 to move when detent 266 is present.

With testing system 212, test 206 of aircraft 202 may be performed in a manner that overcomes issues associated with currently used testing methodologies in which a pilot moves fuel control switch 238 to shut off position 242. Testing system 212 provides increased accuracy in moving fuel control switch 238 to cause engine 226 to cease operating at about cutoff speed 246 with a desired level of accuracy.

With testing system 212, fewer numbers of runs down runway 208 may occur in test 206 to obtain performance information 254 to identify minimum controllability speed 204. Reducing the number of times that engine 226 ceases operation from flow of fuel 224 being shut off reduces the stress on engine 226 and other parts of aircraft 202. Further, fewer times for performing takeoffs also means fewer landings or aborted takeoffs, which also reduces wear on aircraft 202. As a result, the amount of maintenance for aircraft 202 may be reduced. The amount of fuel used and runway time needed for test 206 may also be reduced with testing system 212.

Figure 3:
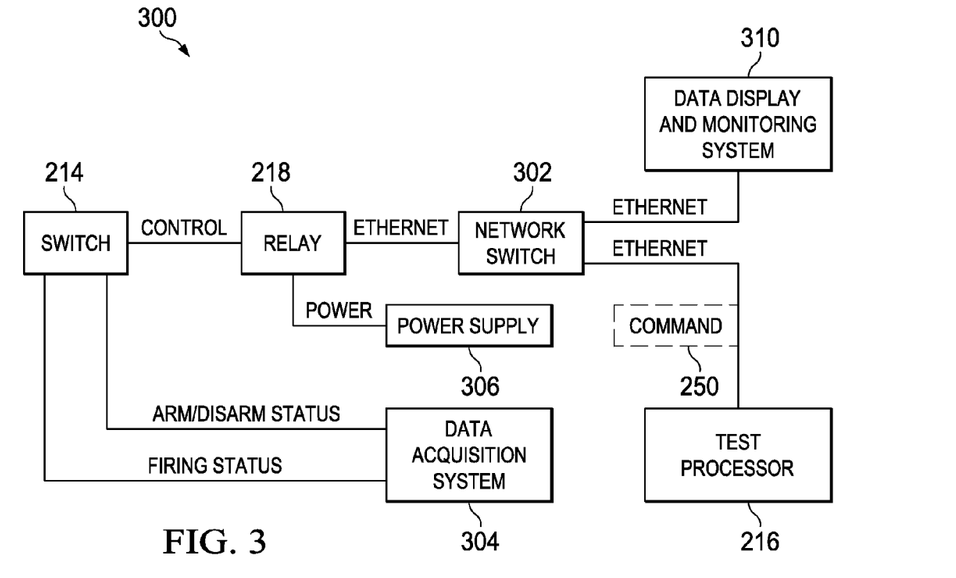
FIG. 3 is an illustration of a schematic diagram of a testing system in accordance with an illustrative embodiment.

With reference next to FIG. 3, an illustration of a schematic diagram of a testing system is depicted in accordance with an illustrative embodiment. Schematic diagram 300 illustrates connections between some components in testing system 212 in FIG. 2. In this illustrative example, switch 214, relay 218, network switch 302, data acquisition system 304, power supply 306, data display and monitoring system 310, and test processor 216 are shown.

Network switch 302 facilitates communication between relay 218, test processor 216, and data display and monitoring system 310 in this example. Network switch 302 is an Ethernet switch in the depicted example. Data acquisition system 304 is also connected to network switch 302. Data acquisition system 304 identifies when command 250 is sent by test processor 216.

Relay 218 is directly connected to switch 214. Power is supplied to relay 218 via a connection to power supply 306. The power is used to generate signal 234 that is sent as a control signal in this example to operate switch 214.

As depicted, data acquisition system 304 is in communication with switch 214 and detects when switch 214 is armed or disarmed. Data acquisition system 304 also detects when switch 214 moves. In the illustrative example, data acquisition system 304 also detects when switch 214 is commanded to move by signal 234 in FIG. 2. This movement may be when switch 214 rotates to move fuel control switch 238 in FIG. 2. In this example, the movement of switch 214 is detected as a firing status.

In the illustrative example, data display and monitoring system 310 detects when command 250 is sent by test processor 216. This information as well as information detected by data acquisition system 304 may be used to calculate delay 248 in FIG. 2. Delay 248 may be identified during validation and development testing. In this implementation, delay 248 may be sent and stored by test processor 216. Test processor 216 then identifies delay 248 during test 206 by retrieving the value stored for delay 248.

In yet other illustrative examples, delay 248 may be identified during test 206 from information sent to test processor 216 from data acquisition system 304 and data display and monitoring system 310. In other words, delay 248 may be identified prior to or during test 206.

The illustration of test environment 100 and different components used in and with test environment 100 in FIGS. 1 and 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, another switch may be present in addition to switch 214. This additional switch may move to shut off flow of fuel 224 to another engine. As another example, test processor 216 may be distributed in different locations in or outside of aircraft 202.

As another example, relay 218 may be omitted or may be included as part of rotary solenoid 230. In yet another illustrative example, at least one of data acquisition system 304 or data display and monitoring system 310 may be implemented in test processor 216. Also, aircraft 202 is described as having engine 226 in FIG. 2. Aircraft 202 may have at least two engines in an illustrative example. Further, test 206 may be performed by testing system 212 on the engines in any location on aircraft 202.

Figure 4:
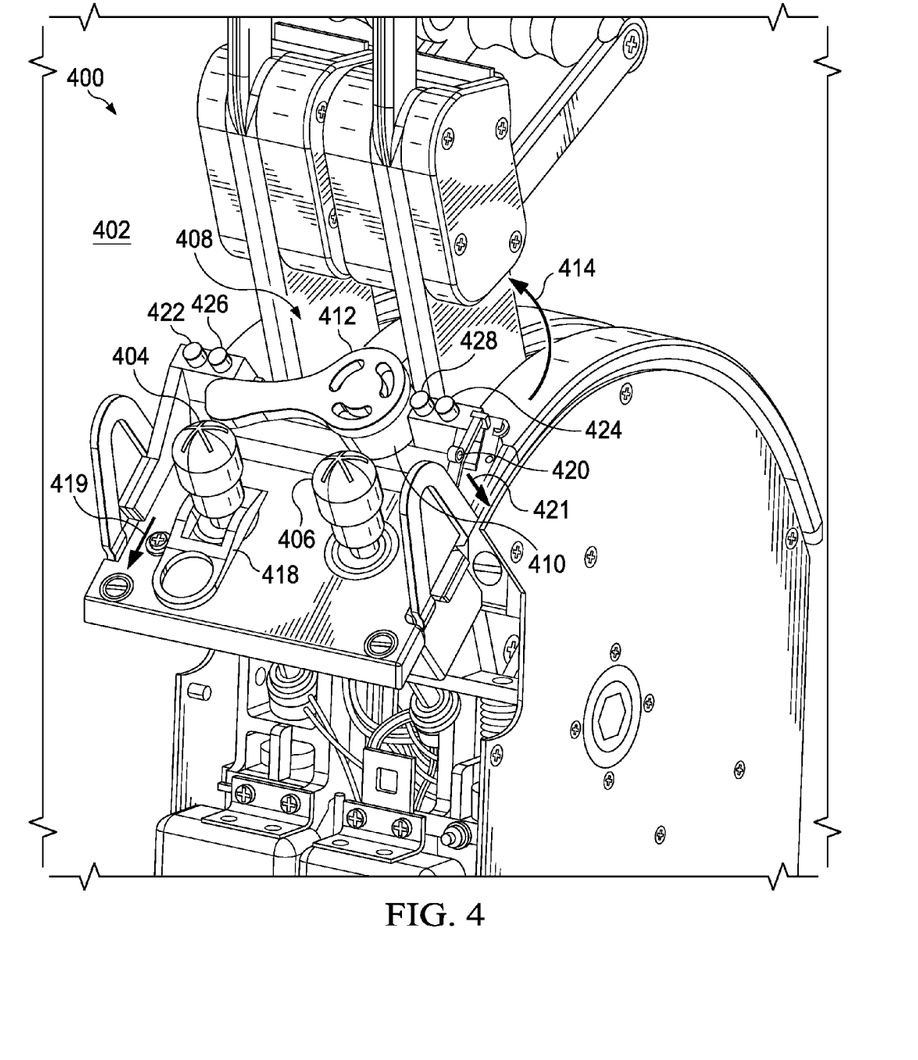
FIG. 4 is an illustration of a portion of a cockpit in accordance with an illustrative embodiment.

Turning next to FIG. 4, an illustration of a portion of a cockpit is depicted in accordance with an illustrative embodiment. In this figure, engine controls 400 are shown in a portion of cockpit 402. Cockpit 402 is a physical example of cockpit 240 shown in block form in FIG. 2 and may be an example of a cockpit in aircraft 102 in FIG. 1.

As depicted, engine controls 400 include fuel control switch 404 and fuel control switch 406. For example, fuel control switch 404 may control the flow of fuel to engine 110 on aircraft 102, and fuel control switch 406 may control the flow of fuel to engine 112 on aircraft 102 in FIG. 1. These fuel control switches are normally manipulated by a pilot.

With the use of a testing system in accordance with an illustrative example, switch 408 is attached to engine controls 400 such that switch 408 is able to move fuel control switch 404. As depicted, switch 408 includes rotary solenoid 410 and arm 412.

In this illustrative example, rotary solenoid 410 moves arm 412 in the direction of arrow 414 when rotary solenoid 410 receives a signal from a relay (not shown). Rotation of arm 412 in the direction of arrow 414 moves switch 408 to an off position. This movement of arm 412 causes fuel control switch 404 to move in the direction of arrow 419 to a shut off position. The shut off position causes the flow of fuel to an engine to stop, which, in turn, causes the engine to cease operation.

Lifter 418 is also connected to engine controls 400. In this example, lifter 418 lifts fuel control switch 404 out of a detent for fuel control switch 404. This lifting allows arm 412 to move and push fuel control switch 404 in the direction of arrow 419 to a shut off position.

In this illustrative example, arming switch 420 is also connected to engine controls 400. Arming switch 420 does not allow switch 408 to operate unless arming switch 420 is depressed in the direction of arrow 421 by a human operator. If the human operator lets go of arming switch 420, arming switch 420 moves back in the opposite direction of arrow 421. In other words, the human operator is required to maintain pressure to depress arming switch 420 and keep arming switch 420 in the depressed position that allows for switch 408 to be armed.

As depicted, arming switch 420 includes indicator 422, indicator 424, indicator 426, and indicator 428. Indicator 422 and indicator 424 light up to indicate that switch 408 is in an armed state and will move fuel control switch 404 when a command is sent. Also, indicator 426 and indicator 428 light up when switch 408 has received a cutoff command to cut off the flow of fuel. In the unarmed state, switch 408 does not move when a command is sent. The normal position for arming switch 420 when not depressed by the human operator prevents a signal from being generated or being sent to switch 408 in the unarmed state.

As depicted in this particular example, switch 408, lifter 418, and arming switch 420 are removably connected to engine controls 400. These components may be removed when testing is not being performed on the aircraft. As a result, removal ensures that undesired movement of fuel control switch 404 does not occur and that undesired shut off of the flow of fuel to an engine also does not occur during normal operation of the aircraft when testing does not occur. This type of design increases safety for the aircraft during normal operation.

The illustration of components in a testing system in FIG. 4 is not meant to limit the manner in which different illustrative examples may be implemented. For example, switch 408 is shown as a rotary switch. In other illustrative examples, switch 408 may be implemented using other types of switches.

In another illustrative example, a linear actuator, a helical switch, or some other suitable type of switch may be used in place of rotary solenoid 410 in switch 408. As another illustrative example, a second switch may be present in place of or in addition to switch 408 caused by movement of fuel control switch 404 to a shut off position.

The different components shown in FIGS. 1 and 4 may be combined with components in FIGS. 2 and 3, used with components in FIGS. 2 and 3, or a combination of the two. Additionally, some of the components in FIGS. 1 and 4 may be illustrative examples of how components shown in block form in FIGS. 2 and 3 can be implemented as physical structures.

Figure 5:
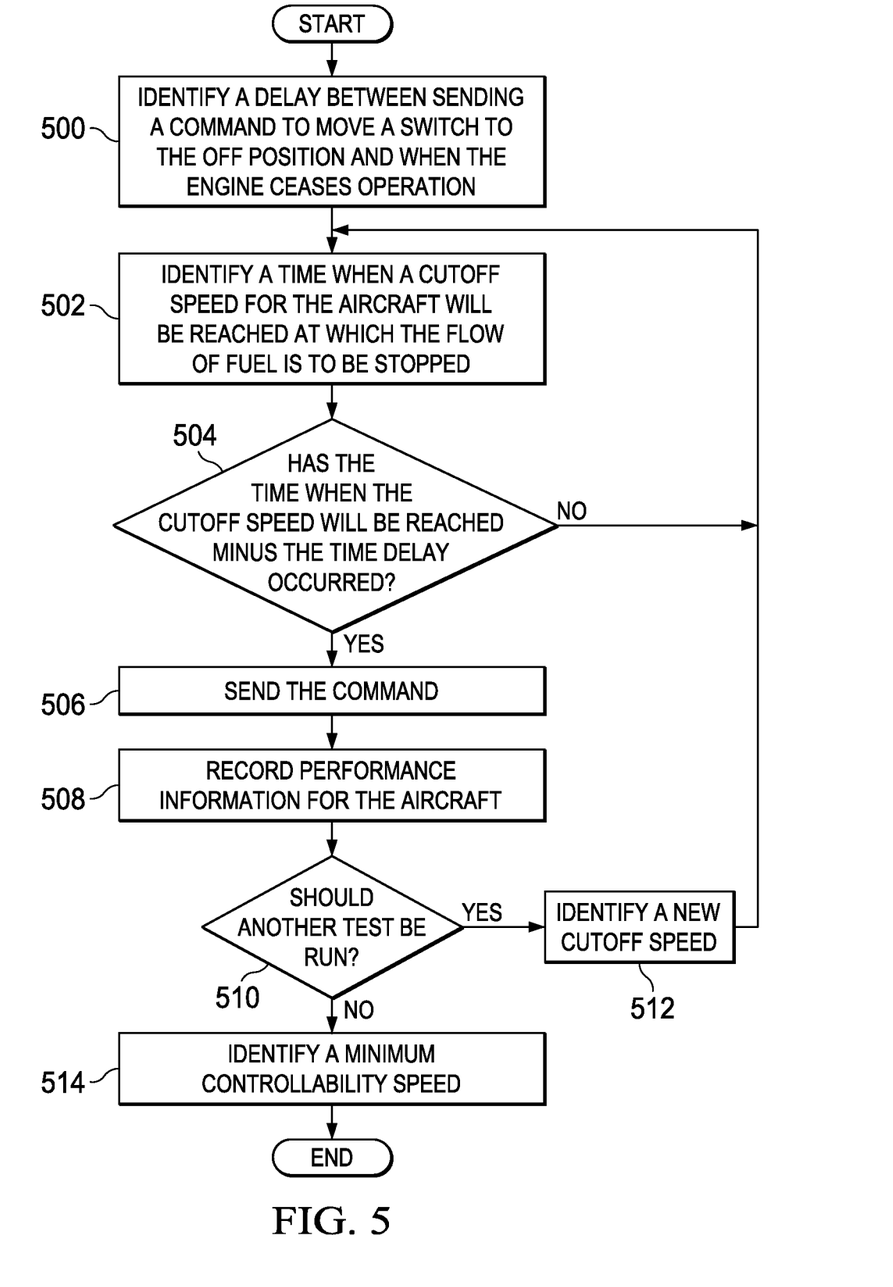
FIG. 5 is an illustration of a flowchart of a process for controlling operation of an engine in accordance with an illustrative embodiment.

Turning next to FIG. 5, an illustration of a flowchart of a process for controlling operation of an engine is depicted in accordance with an illustrative embodiment. The process in FIG. 5 may be implemented in test environment 200 in FIG. 2. The operations in FIG. 1 may be implemented using testing system 212 in FIG. 2.

The process begins by identifying a delay between sending a command to move a switch to the off position and when the engine ceases operation (operation 500). The delay identified may be a constant determined ahead of time for the testing of the aircraft.

The process then identifies a time when a cutoff speed for the aircraft will be reached at which the flow of fuel is to be stopped (operation 502). Operation 502 may be performed when the aircraft begins accelerating for takeoff.

In one illustrative example, once aircraft acceleration is identified, the total acceleration of the aircraft is integrated to obtain ground speed, and the measured groundspeed is used as a complementary filter. A gain is applied to the error between the acceleration-based groundspeed and the measured groundspeed, and applied as a correction to the total acceleration. The average total acceleration is calculated as a weighted moving window of time prior to the current time. The average track angle and average calculated winds are calculated as a weighted triangular moving window of time prior to the current time. The weighted average acceleration and weighted average track angle and wind calculation are then applied to the current airspeed to predict the future airspeed at a point in time equal to the current time plus the system delay.

Thereafter, a determination is made as to whether the time when the cutoff speed will be reached minus the time delay has occurred (operation 504). If the time for when the cutoff speed will be reached minus the time delay has not occurred, the process returns to operation 502 to update the time when the cutoff speed for the aircraft will be reached. In this manner, the accuracy in predicting when the cutoff speed will be reached for the aircraft may be increased.

Otherwise, the process sends the command (operation 506). In this manner, the command may be sent based on the time when the cutoff speed will be reached and the time delay. The command in operation 506 causes the switch to move to the off position moving a fuel control off switch for the engine of the aircraft to a shut off position to stop the flow of fuel to the engine.

The process then records performance information for the aircraft (operation 508). A determination is made as to whether another test should be run (operation 510). If another test should be run, the process identifies a new cutoff speed (operation 512) with the process returning to operation 502 in which the new cutoff speed is the cutoff speed used to determine the time in operation 502.

In the illustrative example, the cutoff speed may be identified based on prior results in performance information recorded for prior cutoff speeds. In other illustrative examples, the new cutoff speed may be selected from a list of cutoff speeds that have been identified prior to the test starting. If a determination is made that another test should not be run in operation 510, the process then identifies a minimum controllability speed (operation 514) with the process terminating thereafter.

Figure 6:
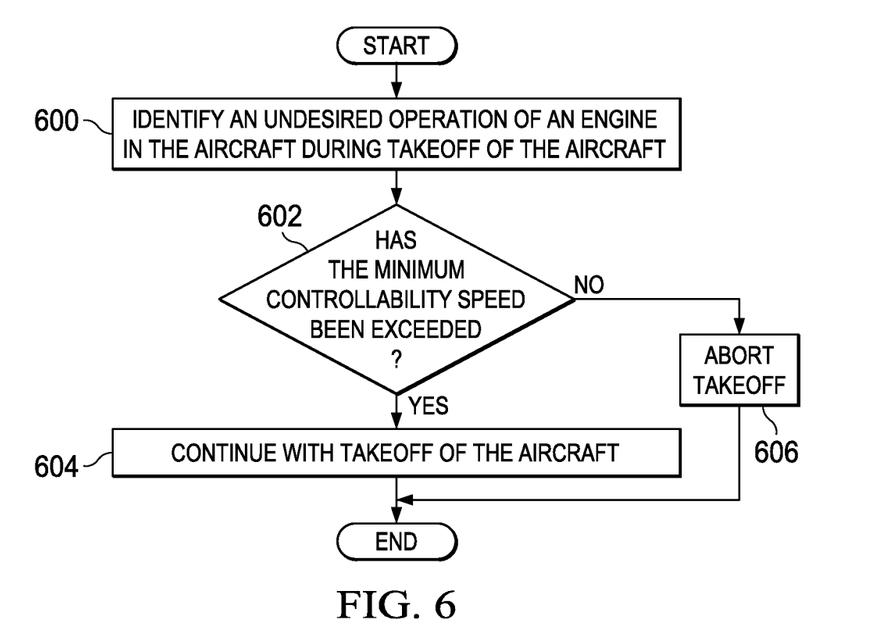
FIG. 6 is an illustration of a flowchart of a process for operating an aircraft in accordance with an illustrative embodiment.

Turning now to FIG. 6, an illustration of a flowchart of a process for operating an aircraft is depicted in accordance with an illustrative embodiment. The process illustrated in FIG. 6 may be used to operate aircraft 102 in FIG. 1 or aircraft 202 in FIG. 2.

The process begins by identifying an undesired operation of an engine in the aircraft during takeoff of the aircraft (operation 600). A determination is made as to whether the minimum controllability speed has been exceeded (operation 602). If the minimum controllability speed has been exceeded, the process continues with takeoff of the aircraft (operation 604) with the process terminating thereafter. Otherwise, the takeoff is aborted (operation 606) with the process terminating thereafter.

In this illustrative example, the minimum controllability speed is identified using the process in FIG. 5. The results of the process in FIG. 5 provide for real world physical effects as shown in FIG. 6. The results may be used by a human operator, such as a pilot, of an aircraft to make decisions on operating the aircraft. By implementing the process in FIG. 5 in testing system 212, the time, expense, and effort in identifying the minimum controllability speed used in decision making in operation 602 may be reduced. Also, the minimum controllability speed may be more accurately identified using the process in FIG. 5 with testing system 212 in FIG. 2.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operation 500 and operation 502 can also be performed at substantially the same time. As another example, after the determination in operation 504, the process may wait for a period of time before returning to operation 502 to update the time when the cutoff speed will occur.

Figure 7:
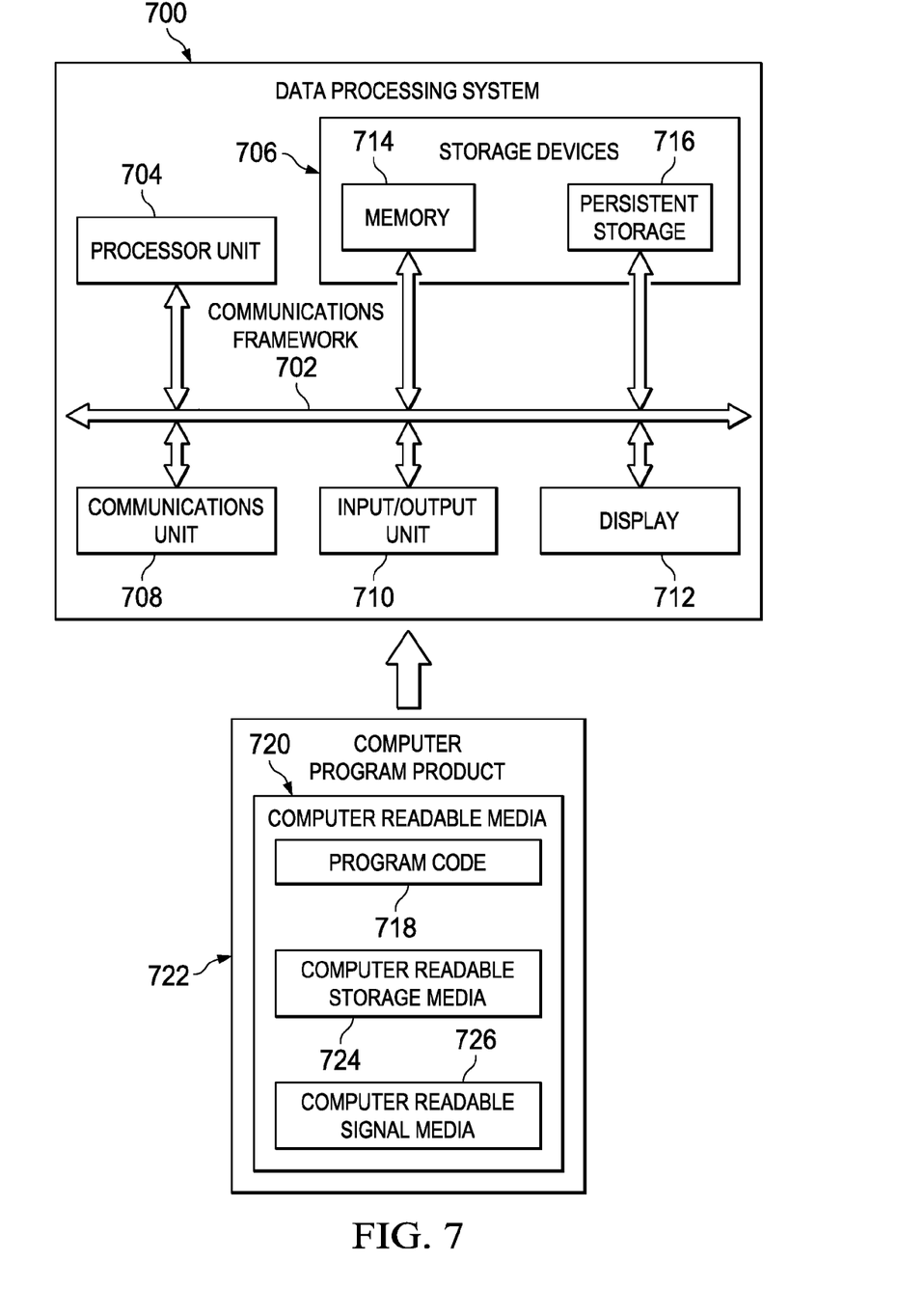
FIG. 7 is an illustration of a data processing system in the form of a block diagram in accordance with an illustrative embodiment.

Turning now to FIG. 7, an illustration of a data processing system in the form of a block diagram is depicted in accordance with an illustrative embodiment. Data processing system 700 may be used to implement one or more computers in computer system 257 in FIG. 2. As depicted, data processing system 700 includes communications framework 702, which provides communications between processor unit 704, storage devices 706, communications unit 708, input/output unit 710, and display 712. In some cases, communications framework 702 may be implemented as a bus system.

Processor unit 704 is configured to execute instructions for software to perform a number of operations. Processor unit 704 may comprise a number of processors, a multi-processor core, and/or some other type of processor, depending on the implementation. In some cases, processor unit 704 may take the form of a hardware unit, such as a circuit system, an application specific integrated circuit (ASIC), a programmable logic device, or some other suitable type of hardware unit.

Instructions for the operating system, applications, and/or programs run by processor unit 704 may be located in storage devices 706. Storage devices 706 may be in communication with processor unit 704 through communications framework 702. As used herein, a storage device, also referred to as a computer readable storage device, is any piece of hardware capable of storing information on a temporary and/or permanent basis. This information may include, but is not limited to, data, program code, and other information.

Memory 714 and persistent storage 716 are examples of storage devices 706. Memory 714 may take the form of, for example, a random access memory or some type of volatile or non-volatile storage device. Persistent storage 716 may comprise any number of components or devices. For example, persistent storage 716 may comprise a hard drive, a flash memory, a rewritable optical disk, a rewritable magnetic tape, or some combination of the above. The media used by persistent storage 716 may or may not be removable.

Communications unit 708 allows data processing system 700 to communicate with other data processing systems and devices. Communications unit 708 may provide communications using physical communications links, wireless communications links, or some combination thereof.

Input/output unit 710 allows input to be received from, and output to be sent to, other devices connected to data processing system 700. For example, input/output unit 710 may allow user input to be received through a keyboard, a mouse, and/or some other type of input device. As another example, input/output unit 710 may allow output to be sent to a printer connected to data processing system 700.

Display 712 is configured to display information to a user. Display 712 may comprise, for example, without limitation, a monitor, a touch screen, a laser display, a holographic display, a virtual display device, or some other type of display device.

In this illustrative example, the processes of the different illustrative embodiments may be performed by processor unit 704 using computer-implemented instructions. These instructions may be referred to as program code, computer usable program code, or computer readable program code and may be read and executed by one or more processors in processor unit 704.

In these examples, program code 718 is located in a functional form on computer readable media 720, which is selectively removable, and may be loaded onto or transferred to data processing system 700 for execution by processor unit 704. Program code 718 and computer readable media 720 together form computer program product 722. In this illustrative example, computer readable media 720 may be computer readable storage media 724 or computer readable signal media 726.

Computer readable storage media 724 is a physical or tangible storage device used to store program code 718 rather than a medium that propagates or transmits program code 718. Computer readable storage media 724 may be, for example, without limitation, an optical or magnetic disk or a persistent storage device that is connected to data processing system 700.

Alternatively, program code 718 may be transferred to data processing system 700 using computer readable signal media 726. Computer readable signal media 726 may be, for example, a propagated data signal containing program code 718. This data signal may be an electromagnetic signal, an optical signal, and/or some other type of signal that can be transmitted over physical and/or wireless communications links.

The illustration of data processing system 700 in FIG. 7 is not meant to provide architectural limitations to the manner in which the illustrative embodiments may be implemented. The different illustrative embodiments may be implemented in a data processing system that includes components in addition to or in place of those illustrated for data processing system 700. Further, components shown in FIG. 7 may be varied from the illustrative examples shown.

Figure 8:
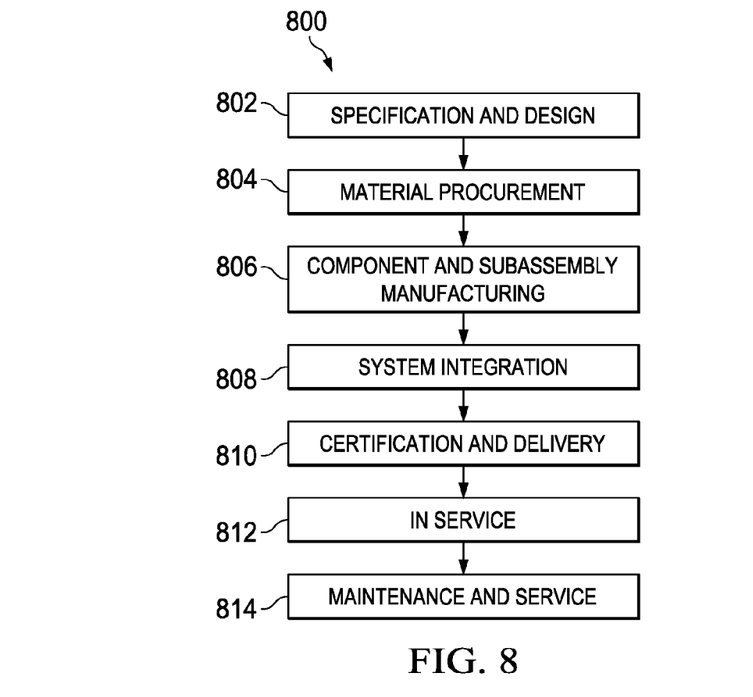
FIG. 8 is an illustration of a block diagram of an aircraft manufacturing and service method.
Figure 9:
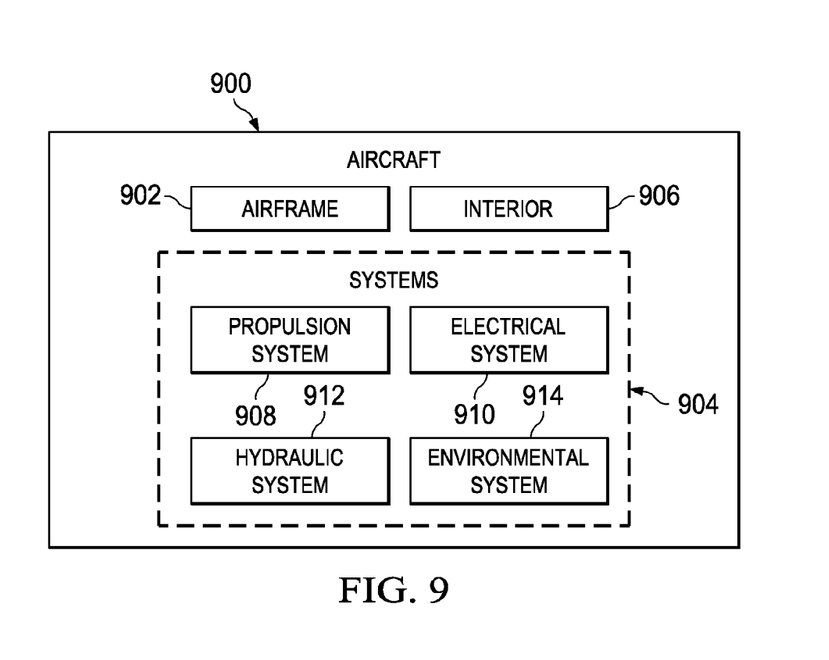
FIG. 9 is an illustration of a block diagram of an aircraft in which an illustrative embodiment may be implemented.

The illustrative embodiments of the disclosure may be described in the context of aircraft manufacturing and service method 800 as shown in FIG. 8 and aircraft 900 as shown in FIG. 9. Turning first to FIG. 8, an illustration of a block diagram of an aircraft manufacturing and service method is depicted in accordance with an illustrative embodiment. During pre-production, aircraft manufacturing and service method 800 may include specification and design 802 of aircraft 900 in FIG. 9 and material procurement 804.

During production, component and subassembly manufacturing 806 and system integration 808 of aircraft 900 in FIG. 9 takes place. Thereafter, aircraft 900 in FIG. 9 may go through certification and delivery 810 in order to be placed in service 812. While in service 812 by a customer, aircraft 900 in FIG. 9 is scheduled for routine maintenance and service 814, which may include modification, reconfiguration, refurbishment, and other maintenance or service.

Each of the processes of aircraft manufacturing and service method 800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 9, an illustration of a block diagram of an aircraft is depicted in which an illustrative embodiment may be implemented. In this example, aircraft 900 is produced by aircraft manufacturing and service method 800 in FIG. 8 and may include airframe 902 with plurality of systems 904 and interior 906. Examples of systems 904 include one or more of propulsion system 908, electrical system 910, hydraulic system 912, and environmental system 914. Any number of other systems may be included. Although an aerospace example is shown, different illustrative embodiments may be applied to other industries, such as the automotive industry. Apparatuses and methods embodied herein may be employed during at least one of the stages of aircraft manufacturing and service method 800 in FIG. 8.

In one illustrative example, one or more apparatus embodiments, method embodiments, or a combination thereof may be utilized while aircraft 900 is in certification and delivery 810, in service 812, during maintenance and service 814 or some combination thereof in FIG. 8. The use of a number of the different illustrative embodiments may substantially expedite the assembly of aircraft 900, reduce the cost of aircraft 900, or both.

The apparatus and method provides for testing an aircraft while more accurately ceasing operation of an aircraft engine at a selected cutoff speed as compared to using a human operator. The increased accuracy reduces the number of times an engine ceases operation in the aircraft. Further, some testing procedures prohibit interpolation of results. As a result, identifying a minimum controllability speed from the amount of lateral deviation may be more accurately and more quickly made as compared to currently used testing processes.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a switch that moves to an off position to stop a flow of fuel to an engine for an aircraft from a fuel source such that the engine ceases operation; and
a test processor that identifies a time when a cutoff speed will be reached at which the flow of fuel is to be stopped; identifies a delay between sending a command to move the switch to the off position and when the engine ceases operation; and sends the command based on the time and the delay.

2. The apparatus of claim 1 further comprising:
a relay connected to the test processor and the switch, wherein the relay sends a signal to the switch that causes the switch to move to the off position when the command is received at the relay.

3. The apparatus of claim 2, wherein the switch comprises:
a rotary solenoid; and
an arm extending from the rotary solenoid, wherein the rotary solenoid rotates the arm to the off position when the rotary solenoid receives the signal from the relay.

4. The apparatus of claim 3, wherein the rotary solenoid with the arm is located in a position relative to a fuel control switch for the engine in a cockpit of the aircraft, such that movement of the arm to the off position moves the fuel control switch to a shut off position.

5. The apparatus of claim 4 further comprising:
a lifter structure that lifts the fuel control switch out of a detent.

6. The apparatus of claim 1 further comprising:
an arming switch that prevents the command from reaching a relay, a signal from being generated, or the signal from reaching the switch when the arming switch is in a disarmed position and allows at least one of the command to reach the relay, the signal to be generated, or the signal to reach the switch when the arming switch is in an armed position.

7. The apparatus of claim 1, wherein the test processor records performance information for the aircraft.

8. The apparatus of claim 7, wherein the performance information comprises at least one of a speed, a ground speed, air speed, acceleration, an Euler angle, yaw, pitch, a wind speed, an inertial acceleration, a sideslip angle, a target cutoff speed, an actual cutoff speed, when armed, when the switch is triggered, a fuel flow, a yaw rate, a gross weight, a center of gravity, a brake pressure, or a flap angle.

9. The apparatus of claim 7, wherein the test processor identifies a new cutoff speed based on the performance information.

10. The apparatus of claim 1, wherein the aircraft has at least two engines.

11. An aircraft test system comprising:
a switch with an arm that moves a fuel control switch for an aircraft engine to a shut off position to stop a flow of fuel to an engine from a fuel source such that the engine ceases operation;
a test processor that identifies a time when a cutoff speed will be reached at which the flow of fuel is to be stopped; identifies a delay between sending a command to move the switch to the off position and when the engine ceases operation; and sends the command based on the time and the delay;
a relay connected to the test processor and the switch, wherein the relay sends a signal to the switch when the relay receives the command and the signal causes the arm to move the fuel control switch to the shut off position; and
a lifter structure that lifts the fuel control switch out of a detent for the fuel control switch.

12. The aircraft test system of claim 11 further comprising:
an arming switch that prevents the command from reaching the relay, the signal from being generated, or the signal from reaching the switch when the arming switch is in a disarmed position and allows at least one of the command to reach the relay, the signal to be generated, or the signal to reach the switch when the arming switch is in an armed position.

13. The aircraft test system of claim 11, wherein the test processor records performance information for the aircraft.

14. A method for controlling operation of an engine in an aircraft, the method comprising:
   identifying a time when a cutoff speed for the aircraft will be reached at which a flow of fuel is to be stopped;
   identifying a delay between sending a command to move a switch to an off position and the time at which the engine ceases operation; and
   sending the command based on the time and the delay, wherein the command causes the switch to move to the off position moving a fuel control switch for the engine of the aircraft to a shut off position to stop the flow of fuel to the engine.

15. The method of claim 14, wherein the switch comprises a rotary solenoid, and an arm extending from the rotary solenoid.

16. The method of claim 15, wherein the rotary solenoid with the arm is located in a position relative to the fuel control switch for the engine in a cockpit of the aircraft such that movement of the arm to the off position moves the fuel control switch to the shut off position.

17. The method of claim 14 further comprising:
   preventing the command from reaching a relay when an arming switch is in a disarmed position; and
   allowing the command to reach the relay when the arming switch is held in a depressed position by a human operator.

18. The method of claim 14 further comprising:
   recording performance information for the aircraft.

19. The method of claim 18, wherein the performance information comprises at least one of a speed, a ground speed, air speed, acceleration, yaw, pitch, a wind speed, an inertial acceleration, an Euler angle, a sideslip angle, a target cutoff speed, an actual cutoff speed, when armed, when the switch is triggered, a fuel flow, a yaw rate, a gross weight, a center of gravity, a brake pressure, or a flap angle.

20. The method of claim 18 further comprising:
   identifying a new cutoff speed based on the performance information.

* * * * *